(12) United States Patent
Lee

(10) Patent No.: US 11,751,720 B2
(45) Date of Patent: Sep. 12, 2023

(54) MOVABLE TYPE GRILL ROASTER

(71) Applicant: KICHAN HI-TECH CO., LTD., Bucheon-si (KR)

(72) Inventor: Keunho Lee, Incheon (KR)

(73) Assignee: KICHAN HI-TECH CO., LTD., Bucheon-si (KR)

( * ) Notice: Subject to any disclaimer, the term of this patent is extended or adjusted under 35 U.S.C. 154(b) by 555 days.

(21) Appl. No.: 17/045,576

(22) PCT Filed: Mar. 7, 2019

(86) PCT No.: PCT/KR2019/002661
§ 371 (c)(1),
(2) Date: Oct. 6, 2020

(87) PCT Pub. No.: WO2019/203440
PCT Pub. Date: Oct. 24, 2019

(65) Prior Publication Data
US 2021/0022549 A1 Jan. 28, 2021

(30) Foreign Application Priority Data
Apr. 19, 2018 (KR) .................. 10-2018-0045495

(51) Int. Cl.
*A47J 37/04* (2006.01)
(52) U.S. Cl.
CPC .......... *A47J 37/045* (2013.01); *A47J 37/041* (2013.01); *A47J 37/049* (2013.01); *A47J 37/044* (2013.01)

(58) Field of Classification Search
CPC ...... A47J 37/044; A47J 37/045; A47J 37/048; A47J 37/049; A47J 37/0857
See application file for complete search history.

(56) References Cited

U.S. PATENT DOCUMENTS 3,604,336 A * 9/1971 Straub .................. A47J 37/044
126/41 R
2020/0060475 A1 * 2/2020 Hohler ................. A47J 37/1228

FOREIGN PATENT DOCUMENTS

| KR | 200413229 | B1 | * | 4/2006 | ............ A47J 37/045 |
| KR | 100630881 | B1 | * | 10/2006 | ............ A47J 37/045 |
| KR | 100661086 | B1 | * | 12/2006 | ............ A47J 37/045 |
| KR | 100763576 | B1 | * | 10/2007 | ............ A47J 37/045 |

* cited by examiner

*Primary Examiner* — Reginald Alexander
(74) *Attorney, Agent, or Firm* — KORUS Patent, LLC; Seong Il Jeong

(57) ABSTRACT

The present invention discloses a movable type grill roaster. In the present invention, bucket depressions and a rod rolling part are provided in a chain. Accordingly, when grilling rods constituting a grill roasting plate are sequentially transferred via the chain, the grilling rods may be transferred while being rolled. The phenomenon in which meat adheres to the grilling rods is prevented. The sequentially supplied grilling rods are arranged at stable locations, and thus there is overcome the problem in which meat falls between the grilling rods constituting a grill roasting plate. When the grilling rods fall to a collection container, the falling grilling rods may be evenly distributed without being concentrated on any one point in the collection container via a fall guide piece. The convenience in use is improved during a grilling rod supply process, a meat roasting process, and a grilling rod collection process.

5 Claims, 14 Drawing Sheets

MOVABLE TYPE GRILL ROASTER

TECHNICAL FIELD

The present invention relates generally to a movable type grill roaster, and more particularly to a movable type grill roaster that allows grilling rods, which are deployed along a transfer part composed of a bucket-integrated chain, to be sequentially transferred while being rolled and be then placed densely to form a single grill-type roasting plate, so that when meat is placed at a point from which the supply of grilling rods starts, the meat placed on the grilling rods that are successively supplied in a state in which both ends of the grilling rods are seated on buckets integrated with the chain is evenly cooked while slowly passing over a charcoal fire.

BACKGROUND ART

In general, charcoal roasting plates used in restaurants, etc. are composed of simple grills in a circular or square shape. In the case of using such conventional grills as charcoal roasting plates, in order to prevent meat from burning, it is usually necessary to replace such a roasting plate three or four times. The conventional charcoal roasting plates are inconvenient in use due to frequent replacement, and there is a high risk of safety accidents when the roasting plates are replaced by employees. The conventional charcoal roasting plates also have many problems such as customer complaints attributable to the late replacement of charcoal roasting plates and an increase in labor cost attributable to an increase in the number of employees.

Furthermore, in the cleaning of the charcoal roasting plates, there is a problem such as increases in work time and labor cost attributable to the difficulty of work that occurs because separate employees manually clean the charcoal roasting plates by hand, thereby increasing management expenses.

Meanwhile, in the case of a charcoal roasting plate used as an outdoor barbecue-type roasting plate, a grill or the like is placed and used in a simple shape like the conventional charcoal roasting plate described above.

In order to prevent meat from burning, it is also necessary to replace the roasting plate. However, since it is difficult to provide a separate roasting plate, there are many cases in which a single roasting plate is used without replacement. Even in the cleaning of the roasting plate, a problem arises in that the operation of cleaning the roasting plate is difficult.

Accordingly, although the rotary charcoal roasting plate has been disclosed conventionally, the rotary charcoal roasting plate does not effectively solve the following problems:

First, a problem arises in that grilling rods are removed during transport.

Second, a problem arises in that a large number of rods accommodated in the supply part provided in the form of a hopper are stacked together in a predetermined space, and thus they are pressed by their own weight and cannot be discharged smoothly to the bottom.

Third, when the number of grilling rods accommodated in the supply part is small, internal pressing pressure decreases significantly, and thus the supply of grilling rods is interrupted.

Fourth, since the successively supplied grilling rods are only horizontally moved along the chain, there is not overcome the phenomenon in which meat sticks to the surfaces of the rods as the supplied grilling rods are heated.

Fifth, in order to remove a charcoal fire after meat has been roasted, there is the inconvenience of artificially removing the grilling rods supplied along the chain.

Sixth, when the grilling rods the surfaces of which are contaminated with oil are accumulated in a collection container, they fall intensively at a location adjacent to the drop point of the chain and become entangled, and thus the effective space of the collection container is not efficiently used, with the result that a problem arises in that the collection container had to be replaced unnecessarily frequently.

DISCLOSURE

Technical Problem

The present invention has been conceived to overcome the above-described problems of the conventional art, and an object of the present invention is to provide a movable type grill roaster that allows grilling rods, which are deployed along a transfer part composed of a bucket-integrated chain, to be sequentially transferred while being rolled and be then placed densely to form a single grill-type roasting plate, so that when meat is placed at the point from which the supply of grilling rods starts, the meat placed on the grilling rods that are successively supplied in a state in which both ends of the grilling rods are seated on buckets integrated with the chain is evenly cooked while slowly passing over a charcoal fire.

Another object of the present invention is to provide a movable type grill roaster in which a rod rolling part configured to continuously roll grilling rods is additionally installed over the grilling rods that are successively supplied along a chain while being maintained at dense intervals, and thus meat is prevented from adhering to the grilling rods by continuously rolling the grilling rods in contact with the meat.

Another object of the present invention is to provide a movable type grill roaster in which when grilling rods are sequentially supplied, the supply allows the grilling rods to be arranged at stable locations while maintaining predetermined intervals, and thus there is overcome a problem in which meat falls between the grilling rods constituting a grill roasting plate for the roasting of meat, and thus oil is burned, so that dust containing harmful gases and carcinogens rises and adheres to the meat, thereby adversely affecting health.

Still another object of the present invention is to provide a movable type grill roaster which is equipped with a grilling rod supply stopping function capable of overcoming the inconvenience of separating grilling rods, supplied along a chain, upward when removing a charcoal fire from the roaster after the completion of predetermined roasting.

Still another object of the present invention is to provide a movable type grill roaster which when grilling rods fall into a collection container, allows the falling grilling rods to be evenly distributed without being concentrated on any one point in the collection container and be then collected via a fall guide piece, and also mitigates the inconvenience of unnecessarily frequently replacing a collection container.

Technical Solution

In order to accomplish the above objects, the present invention provides a movable type grill roaster including: a supply part adapted to sequentially supply grilling rods in order to form a grill roasting plate, and configured such that the bottom surface thereof is composed of an inclined hopper, a rod exit is formed at the lower end of the hopper, and a drawing-out blocking member configured to temporarily block the supply of the grilling rods that are successively loaded into bucket depressions is disposed outside the rod exit; a chain part configured to include a pair of left and right parts, to have the bucket depressions in which the grilling rods sequentially supplied from the supply part are sequentially seated and arranged, and to be rotated and transferred by a drive unit and sequentially transfer the grilling rods; a rod rolling part configured to, when the grilling rods seated and arranged in the bucket depressions of the chain part are sequentially transferred, come into elastic contact with both side ends of the grilling rods and continuously roll the grilling rods in contact with meat at a predetermined speed; and a collection container configured to, when the grilling rods that have been used as a grill roasting plate fall from the chain part while being transferred by the chain part, collect the falling the grilling rods.

According to one aspect of the present invention, the drawing-out blocking member includes: a rod supply wheel disposed near the rod exit, and provided with drawing-out depressions that are intended to sequentially draw out the grilling rods, drawn out from the rod exit, one by one; a second driven gear configured to form an integrated structure with the rod supply wheel and to rotate the rod supply wheel in order to draw out the grilling rod; a transfer gear configured to be engaged with a first driven gear transferring a driving force and the second driven gear and to rotate the second driven gear in response to the driving force of a first motor that is transferred from the first driven gear; a clutch lever connected to the transfer gear, and configured to operate to perform engagement or disengagement between the transfer gear and the first driven gear; an actuator configured to move the clutch lever through the operation of coming into contact with the clutch lever; and a spring configured to return the clutch lever to its original position so that the transfer gear is engaged with the first driven gear when the actuator does not come into contact with the clutch lever.

According to another aspect of the present invention, the rod rolling part includes: guide rollers disposed at both ends of a portion beneath the chain part; a rubber ring belt-type rod rolling ring configured to be coupled to the guide rollers in order to roll the grilling rods beneath the chain part, to foam a closed loop, and to come into tight contact with bottoms of the grilling rods; and a second motor connected to any one of the plurality of guide rollers.

According to still another aspect of the present invention, a rod separation prevention fastening bracket configured to be closely tightened via vertical elongated holes in order to prevent the grilling rods from being separated upward is installed over the chain part.

According to still another aspect of the present invention, the movable type grill roaster is equipped with a touch-type control panel, and the control panel is provided with a power on/off switch, a first button configured to provide notification of a state of finishing a meal and to request the removal of a charcoal fire, a second button configured to control a moving speed to become higher so that an overall roasting plate in use is rapidly replaced, and a third button configured to allow a roasting plate on which food to be roasted is placed to be slowly moved horizontally and then collected in a general dining mode.

According to still another aspect of the present invention, when the grilling rods are used for roasting meat without seasoning, each of the grilling rods may include a main rod configured to come into contact with meat and mounting rods disposed on both ends of the main rod and configured to have a diameter smaller than that of the main rod.

According to still another aspect of the present invention, the main rods may have circular sections that are continuously rotated while maintaining a separation distance within the range of 1 to 2 mm so that oil seeping from meat stays between the main rods and is thus prevented from falling to a charcoal fire and burning.

According to still another aspect of the present invention, the main rods may have straight-sided sections that are continuously rotated while maintaining a separation distance of 2 mm or more so that oil seeping from meat stays between the main rods and is thus prevented from falling to a charcoal fire and burning.

According to still another aspect of the present invention, the drive unit includes: a first motor configured to operate to rotate a driving gear; a first driven gear connected to the driving gear by a driving belt; a first chain gear connected to one surface of the first driven gear by a fastening shaft, and also connected to the chain part forming a closed circuit; a second chain gear spaced apart from the first chain gear by a predetermined distance, and provided on a side from which the grilling rods are supplied; and a third chain gear spaced apart from the second chain gear by a predetermined distance and provided on a side on which the grilling rods are collected.

According to still another aspect of the present invention, a first ratchet gear is preferably connected to the third chain gear adjacent to the collection container by means of a belt, and a fall guide plate configured such that the inclination angle thereof is changed to allow the grilling rods falling from the bucket depressions to sequentially fall to the collection container when the first ratchet gear is rotated is connected to the first ratchet gear.

According to still another aspect of the present invention, the fall guide plate is composed of a corrugated plate structure that is maintained in a horizontal state, a rotating shaft is coupled to one end of the corrugated plate structure, and second ratchet gears configured to be engaged with the first ratchet gear are formed at both ends of the rotating shaft.

According to still another aspect of the present invention, a rod arrangement portion configured to prevent the grilling rods falling sequentially via the fall guide plate from being concentrated and stacked at any one position may be formed on the bottom of the inner side of the collection container.

According to still another aspect of the present invention, load distribution plates configured to prevent the grilling rods from being stagnated by pressing pressure and distribute the load of the grilling rods may be installed to intersect each other on both left and right sides of the hopper.

According to still another aspect of the present invention, the chain part may include: first chain connection pieces each provided with a pair of first hollow holes formed at both ends thereof, and composed of a unit block including a plurality of top seating surfaces extended upward and bent using the interval between the center lines of the pair of first hollow holes as a reference width, and a bucket depression configured such that both ends of a corresponding one of the grilling rods are seated therein is formed between the top seating surfaces; second chain connection pieces each provided with a pair of second hollow holes formed at both ends thereof and each configured to connect the two adjacent first chain connection pieces; and chain coupling pins provided with pin portions that are fitted into the first and second hollow holes at both ends thereof, and configured to connect the first and second chain connection pieces so that the first and second chain connection pieces maintain stable support force while suppressing twisting.

According to still another aspect of the present invention, the pin portion includes: a first pin portion adapted to be fitted into the first hollow hole, and configured such that the end thereof is exposed to the outside to provide a final rivet finish; and a second pin portion configured to be thicker than the first pin portion and thinner than the center of the chain coupling pin and to be separated by stepped portions from the first pin portion and the center of the chain coupling pin, and formed to be slightly larger than the thickness of the second chain connecting piece; wherein the first and second chain connecting pieces are coupled in a state of suppressing friction intervention while maintaining the minimum separation distance.

According to still another aspect of the present invention, each of the bucket depressions is designed to be lower than the height of the grilling rod to expose part of both end mounting portions of the grilling rod, an inclined surface configured to guide the grilling rod through entry into the bucket depression is formed at one end of the top seating surface, and a stop protrusion configured to prevent the removal of the grilling rod that is seated in the bucket depression to be partially exposed is formed at the other end of the top seating surface.

Advantageous Effects

According to the present invention, the bucket depressions and the rod rolling part are disposed in the chain, i.e., a transfer part, the arrangement members configured to arrange the supply and collection of grilling rods are disposed in the supply part and the collection container, and grilling rods are transferred while rolling when the grilling rods constituting a grill roasting plate are sequentially transferred via the chain, i.e., a transfer part. Through this, the following effects are expected:

First, a problem in which grilling rods being transferred are removed is overcome.

Second, even when a large number of rods stored in the supply part provided in the form of a hopper are stacked together in a predetermined space, they are sequentially discharged by their own weight, thereby overcoming a problem in which the supply of the grilling rods is stopped.

Third, the grilling rods that are sequentially transferred are transferred while being maintained at predetermined intervals, and thus there is overcome a problem in which meat falls between the grilling rods constituting a grill roasting plate for the roasting of meat, and thus oil is burned, so that dust containing harmful gases and carcinogens rises and adheres to the meat, thereby adversely affecting health.

Fourth, when the grilling rods supplied along the chain fall to the collection container and are collected in order to remove a charcoal fire after the roasting of meat, the grilling rods are allowed to fall while being evenly distributed without being concentrated on any one point via the fall guide piece to prevent the phenomenon of being entangled while falling intensively to a point adjacent to the falling point of the chain, thereby overcoming the problem of unnecessarily frequently replacing the collection container while efficiently utilizing the effective space of the collection container.

The effects of the present invention are not limited to the above-described effects, and other effects that are not mentioned will be apparently understood by those skilled in the art from the description of the attached claims.

MODE FOR INVENTION

Embodiments of the present invention will be described below with reference to the accompanying drawings.

Figure 1:
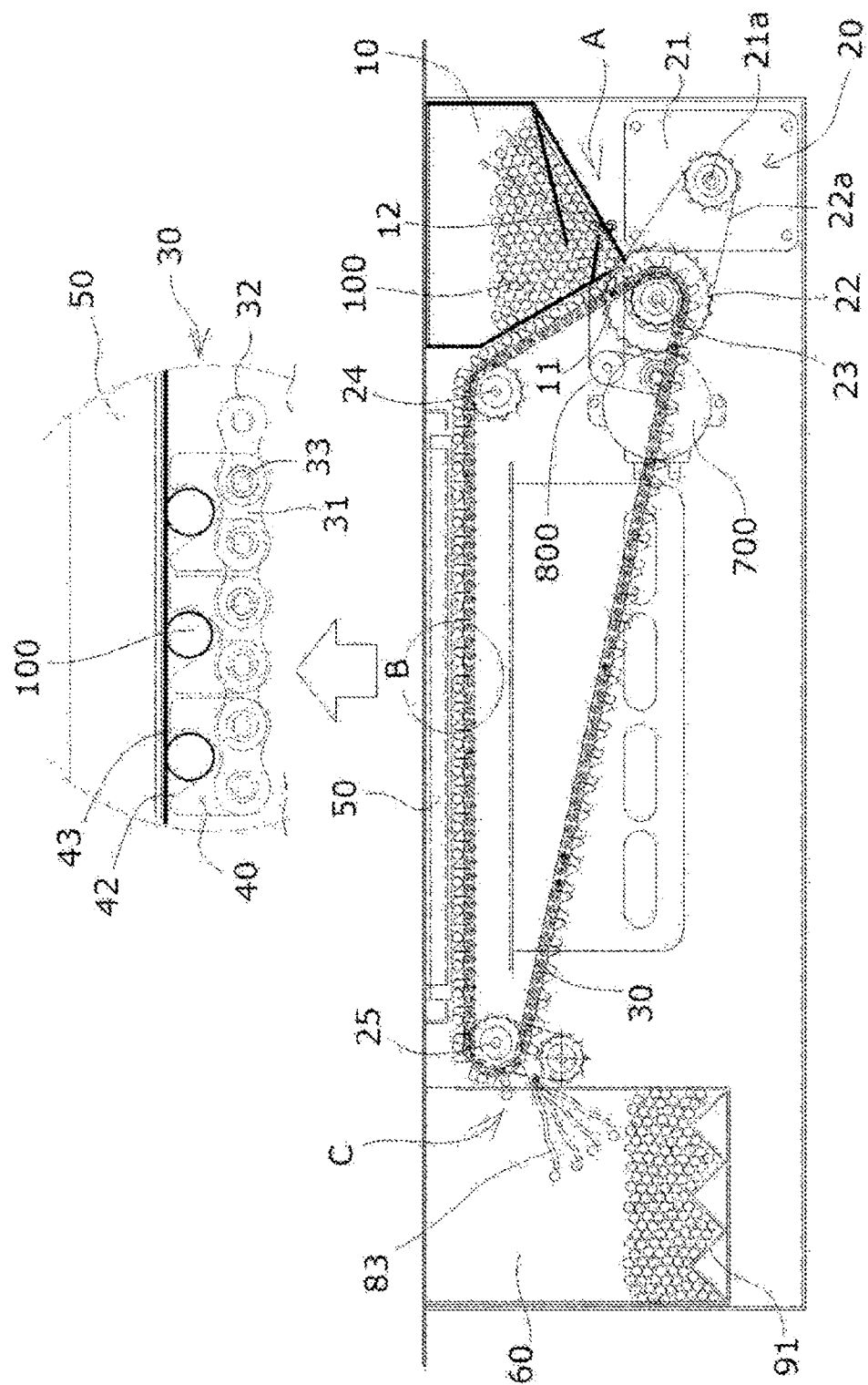
FIG. 1 is an overall sectional schematic diagram of a movable type grill roaster according to an embodiment of the present invention.
Figure 2:
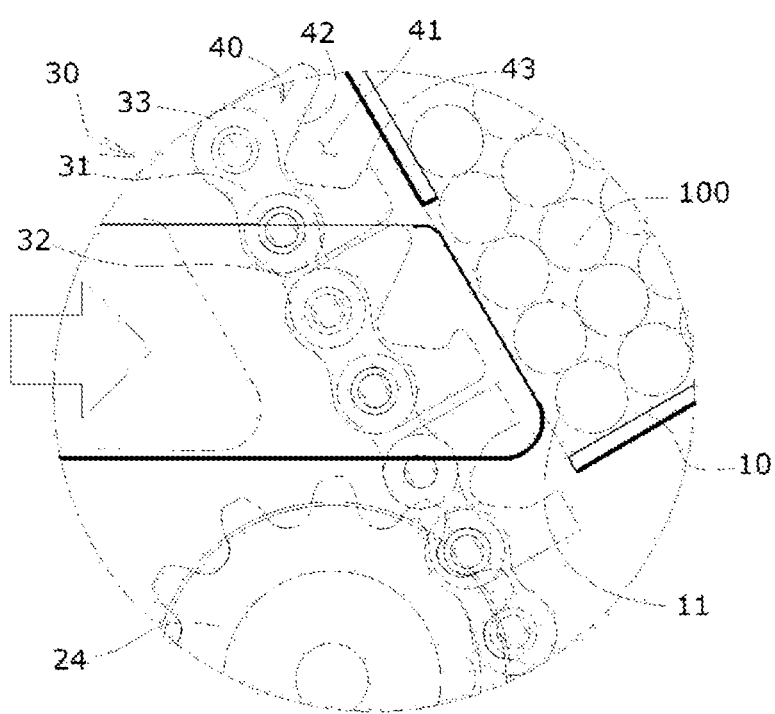
FIG. 2 is an enlarged view of portion "A" of FIG. 1 according to the embodiment of the present invention.
Figure 3:
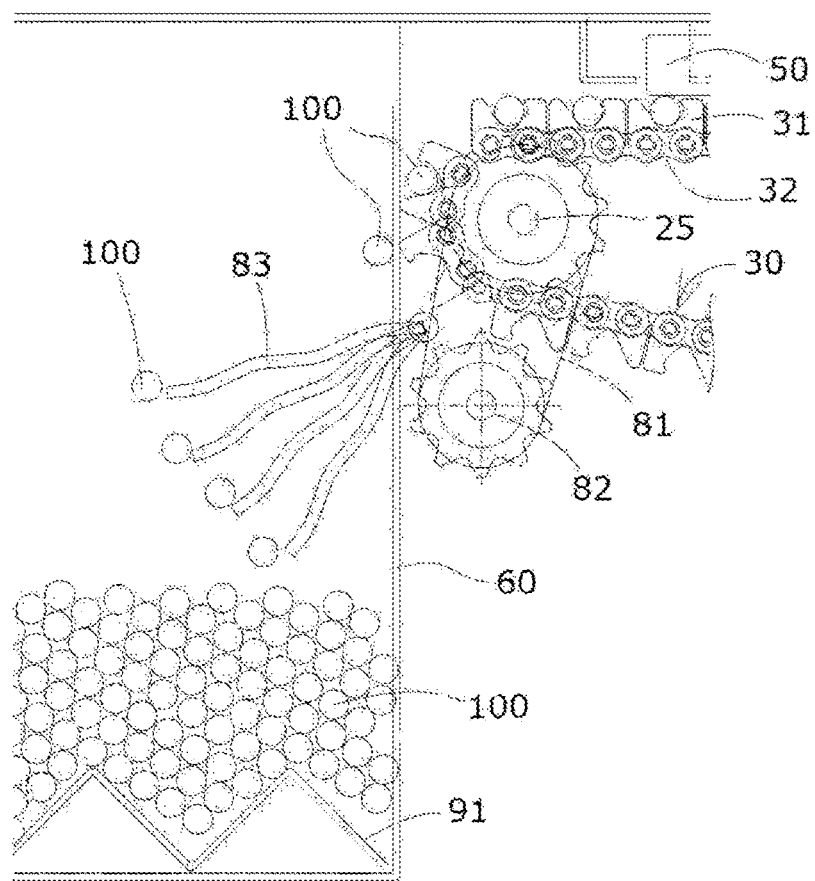
FIG. 3 is an enlarged view of portion "C" of FIG. 1 according to the embodiment of the present invention.

FIG. 1 is an overall sectional schematic diagram of a movable type grill roaster according to an embodiment of the present invention, FIG. 2 is an enlarged view of portion "A" of FIG. 1 according to the embodiment of the present invention, and FIG. 3 is an enlarged view of portion "C" of FIG. 1 according to the embodiment of the present invention.

Referring to the accompanying FIGS. 1 to 3, a movable type grill roaster according to an embodiment of the present invention is configured to include a supply part 10, a first drive unit 20, a pair of left and right chain units 30, a rod rolling part 50, and a collection container 60.

The supply part 10 is intended to sequentially supply grilling rods 100 configured to form a grill roasting plate, and is a detachable, movable hopper having an inclined bottom surface. A rod exit 11 is formed at the lower end of the supply part 10 so that accommodated grilling rods 100 are drawn out by their own weight.

Furthermore, load distribution plates 12 configured to distribute the load of the grilling rods 100 are installed to intersect each other on both left and right sides of the hopper. The load distribution plates 12 prevent the drawing of the grilling rods 100 through the rod exit 11 from being stopped as the grilling rods 100 are stagnated by pressing pressure.

In this case, the grilling rods 100 are used for meat roasting without seasoning or for charcoal grilling. When the grilling rods 100 are used for charcoal grilling, a rod-shaped structure having a single diameter is applied, as shown in FIG. 8(a).

In contrast, as shown the accompanying FIGS. 7(b), 7(c) and 7(d), when the grilling rods 100' are used for meat roasting without seasoning, each of the grilling rods 100' includes a main rod 101 configured to come into contact with meat and mounting rods 102 configured to extend from both ends of the main rod 101 and to have a diameter smaller than that of the main rod 101.

Figure 7:
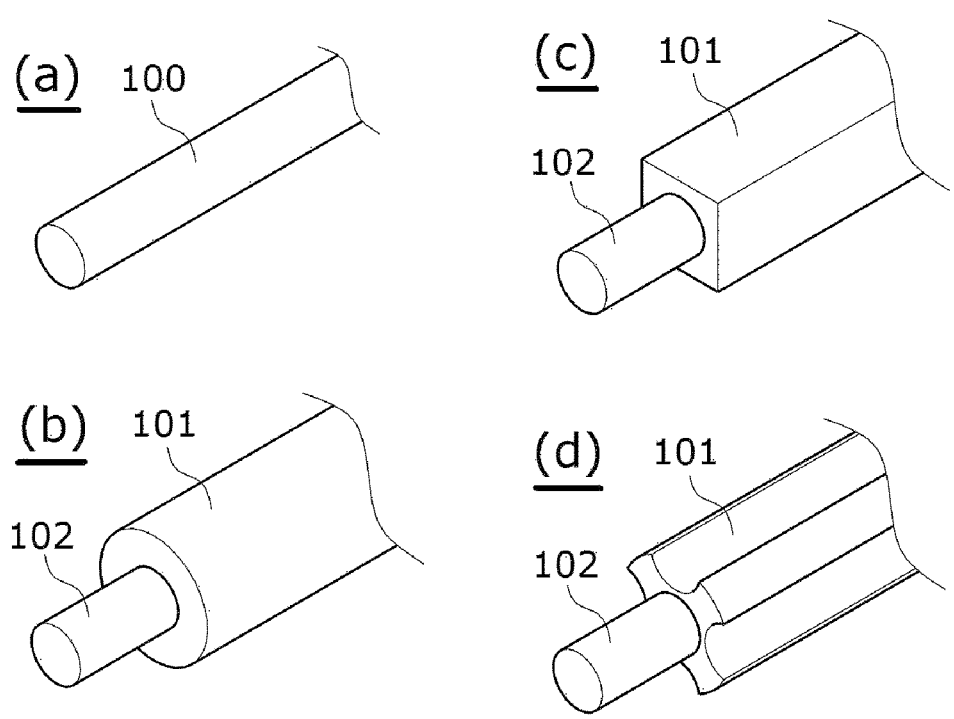
FIGS. 7(a), 7(b), 7(c) and 7(d) are views showing the structures of meat grilling rods according to embodiments of the present invention.
Figure 8:
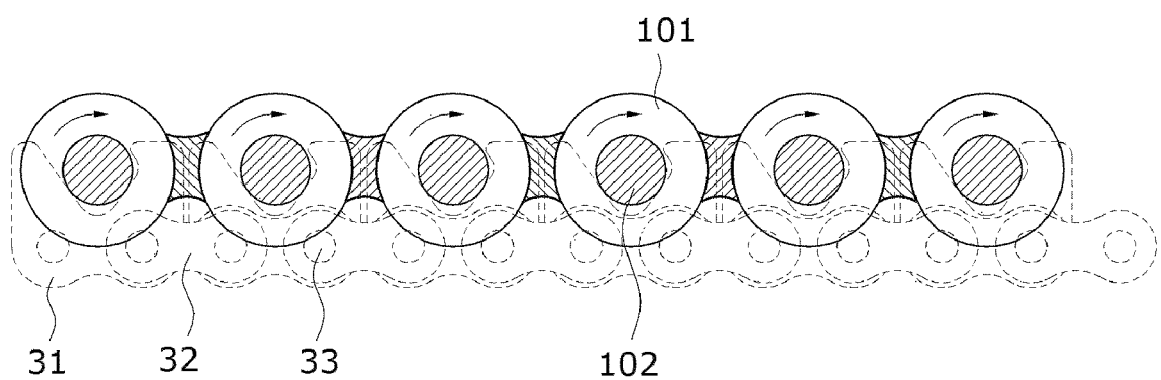
FIG. 8 is a sectional schematic diagram showing a state in which grilling rods shown in FIG. 7(b), i.e., raw meat grilling rods, according to an embodiment of the present invention are seated in bucket depressions of chain connection pieces.

In this case, as shown in the accompanying FIGS. 7(b) and 8, the main rods 101 may have circular sections that rotate continuously while maintaining a separation distance within the range of 1 to 2 mm. As shown in the accompanying FIGS. 7(c) and 7(d), the main rods 101 may have straight-sided sections that rotate continuously while maintaining a separation distance of 2 mm or more. The reason why the main rods 101 are configured to have circular or straight-sided sections is to prevent the oil, seeping from meat, from falling down to charcoal and burning while staying between the main rods 101.

The drive unit 20 includes: a first motor 21 configured to operate to rotate a driving gear 21a; a first driven gear 22 connected to the driving gear 21a by a driving belt 22a; a first chain gear 23 connected to one surface of the first driven gear 22 by a fastening shaft, and configured such that the chain part 30 forming a closed circuit is connected thereto; a second chain gear 24 spaced apart from the first chain gear 23 by a predetermined distance, and provided on a side from which the grilling rods 100 are supplied; and a third chain gear 25 spaced apart from the second chain gear 24 by a predetermined distance, and provided on a side on which the grilling rods 100 are collected.

The chain part 30 is connected to the first, second and third chain gears 23, 24 and 25 included in the drive unit 20, and forms a closed circuit. The section of the chain part 30 between the first and second chain gears 23 and 24 is installed to be inclined in order to stably and sequentially load the grilling rods 100 supplied from the supply part 10. The section of the chain part 30 between the second and third chain gears 24 and 25 is installed to be horizontal in order to allow the grilling rods 100 to form a grill plate member for roasting meat while passing over charcoal at a predetermined speed.

Figure 4:
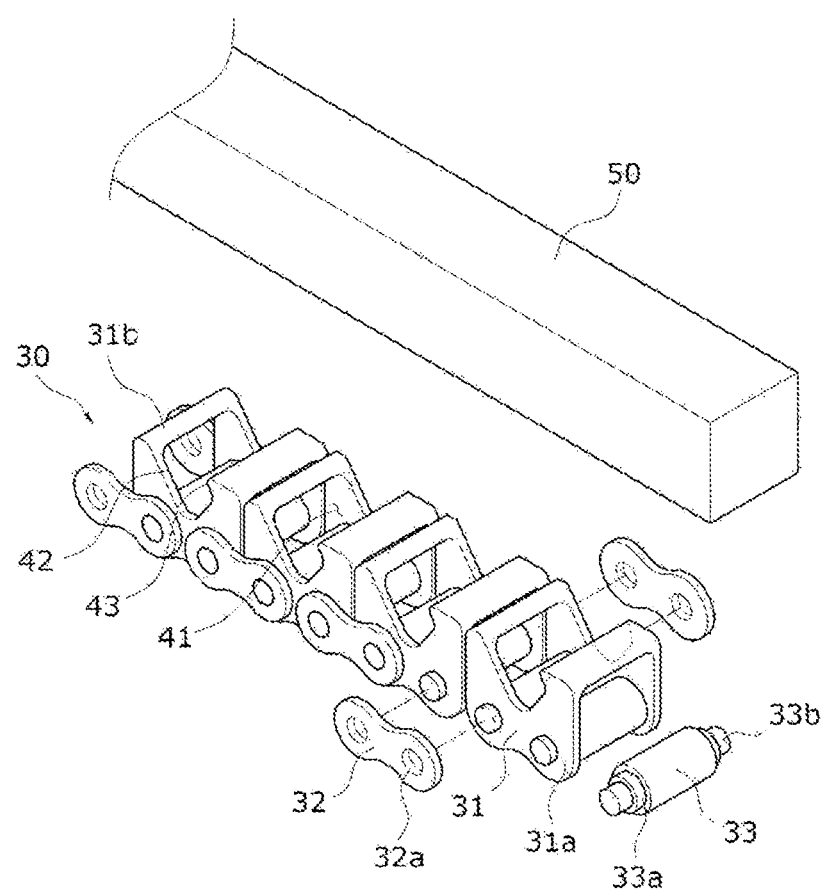
FIG. 4 is an exploded view of a chain structure according to an embodiment of the present invention.
Figure 5:
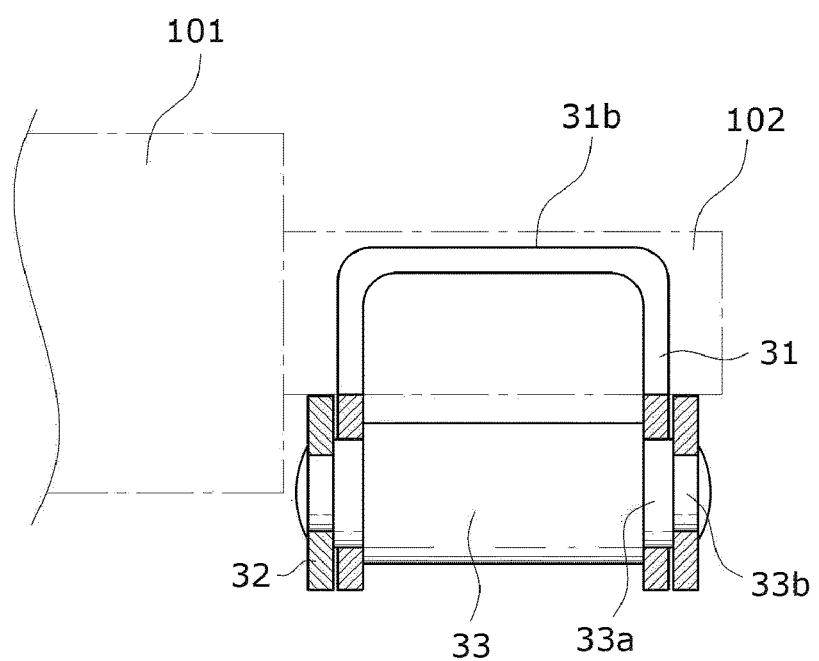
FIG. 5 is a sectional schematic diagram of the chain structure according to the embodiment of the present invention.
Figure 6:
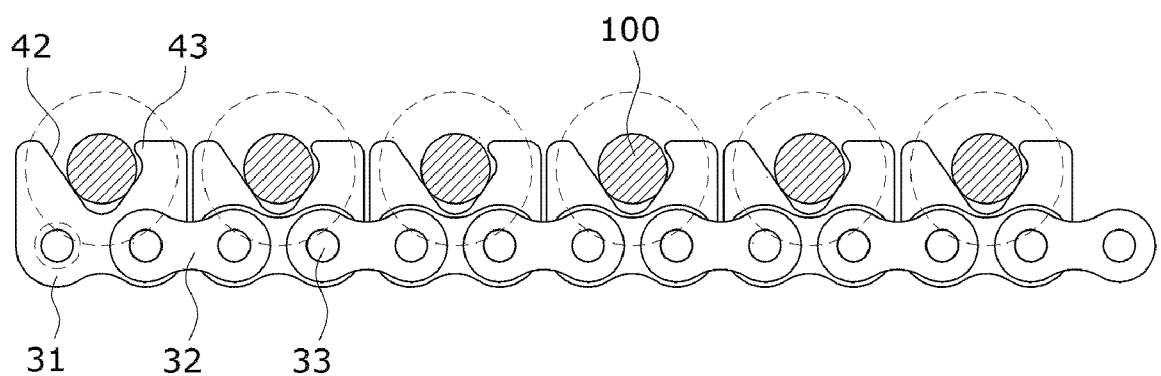
FIG. 6 is a sectional schematic diagram showing a state in which seasoned meat grilling rods according to an embodiment of the present invention are seated in bucket depressions of chain connection pieces.

Accordingly, the chain part 30 has a structure in which first and second chain connection pieces 31 and 32 and chain coupling pins 33 are coupled to one another, as shown in the accompanying FIGS. 4 and 5.

Each of the first chain connection pieces 31 forms a bucket portion 40 having an extended height in an integrated manner on the top surface thereof. A pair of first hollow holes 31a are formed at both ends of a chain connection portion at a lower end, a plurality of top seating surfaces 31b are extended and bent using the interval between the center lines of the pair of first hollow holes 31a as a reference width, and a bucket depression 41 is formed between the top seating surfaces 31b.

In this case, as shown in the accompanying FIGS. 1 and 2, the bucket depression 41 is designed to be lower than the height of the grilling rod 100 and expose part of the grilling rod 100, an inclined surface 42 configured to guide the grilling rod 100 through entry into the bucket depression 41 is formed at one end of the top seating surface 31b, and a stop protrusion 43 configured to prevent the removal of the grilling rod 100 that is seated in the bucket depression 41 to be partially exposed is formed at the other end of the top seating surface 31b.

In other words, when both side ends of the grilling rod 100 drawn out one by one from the rod exit 11 located at the lower end of the supply part 10 is seated in the bucket depression 41, the inclined surface 42 guides the grilling rod 100 through introduction and aligns the grilling rod 100 at the center, and the stop protrusion 43 prevents the grilling rod 100 seated in the bucket depression 41 from being removed from the bucket depression 41.

A pair of second hollow holes 32a are formed at both ends of each of the second chain connection pieces 32, the first, second and third chain gears 23, 24 and 25 are seated on the second chain connection pieces 32, and each of the second chain connection pieces 32a connects a plurality of the first chain connection pieces 31.

The chain coupling pins 33 are provided with first and second pin portions 33a and 33b to be fitted into the first and second hollow holes 31a and 32a at both ends thereof, and connect the first and second chain connection pieces 31 and 32 so that the first and second chain connection pieces 31 and 32 maintain stable support force while suppressing twisting.

The first pin portion 33a is formed to have a thickness smaller than that of the first hollow hole 31a so as to be fitted into the first hollow hole 31a, and the end thereof is exposed to the outside to provide a final rivet finish.

The second pin portion 33b is configured to be thicker than the first pin portion 33a and thinner than the center of the chain coupling pin 33, and is separated by stepped portions from the first pin portion 33a and the center of the chain coupling pin 33. The second pin portion 33b has a thickness slightly smaller than that of the second hollow hole 32a so as to be fitted into the second hollow hole 32a having a diameter larger than that of the first hollow hole 31a, and is formed to be larger than the thickness of the second chain connecting piece 32.

Accordingly, when the first and second chain connecting pieces 31 and 32 are coupled through the first and second pin portions 33a and 33b of the chain connecting pins 33, the first and second chain connecting pieces 31 and 32 may be coupled in a state of suppressing the resistance applied by the pressing friction of the contact surfaces while maintaining the minimum separation distance.

The rod rolling part 50 is installed above the bucket depressions 41 of the first chain connecting pieces 31. More specifically, the rod rolling part 50 is composed of a rubber rod configured to come into contact with the upper ends of the grilling rods 100 that are seated in the bucket depressions 41 and are transferred along the chain part 30 and to roll the grilling rods 100. The rubber rod is formed over the horizontal section of the chain part 30 forming a pair of left and right parts.

The above-described rod rolling part 50 is installed to come into contact with first sides of both ends of the grilling rods 100 moving along the chain, and implements the function of rotating the grilling rods 100 moving along the chain at a constant speed. The following effects are achieved by allowing the grilling rods 100 to be supplied while being rotated, as described above. First, the operation plays the role of preventing the meat placed on the grilling rods from sticking to the surfaces of the grilling rods. Second, the surfaces of the grilling rods heated by charcoal is always maintained at a constant temperature by the rolling, and thus the rolling supply of the grilling rod provides the function of continuously conserving the heat lost from the top surfaces in contact with the meat. Third, the rolling of the grilling rods delays or prevents the oil seeping from the meat and attached to the surfaces of the grilling rods from dripping onto charcoal.

The collection container 60 is configured to collect the falling grilling rods 100 when the grilling rods 100 used as the grill roasting plate are transferred by the chain part 30 and fall from the bucket depressions 41.

In this case, as shown in FIG. 3, a first ratchet gear 82 is connected to the third chain gear 25 adjacent to the collection container 60 by means of a belt 81, and a fall guide plate 83 configured such that an inclination angle thereof is changed to allow the grilling rods 100 falling from the bucket depressions 41 to sequentially fall to the collection container 60 when the first ratchet gear 82 is rotated is connected to the first ratchet gear 82.

Figure 9:
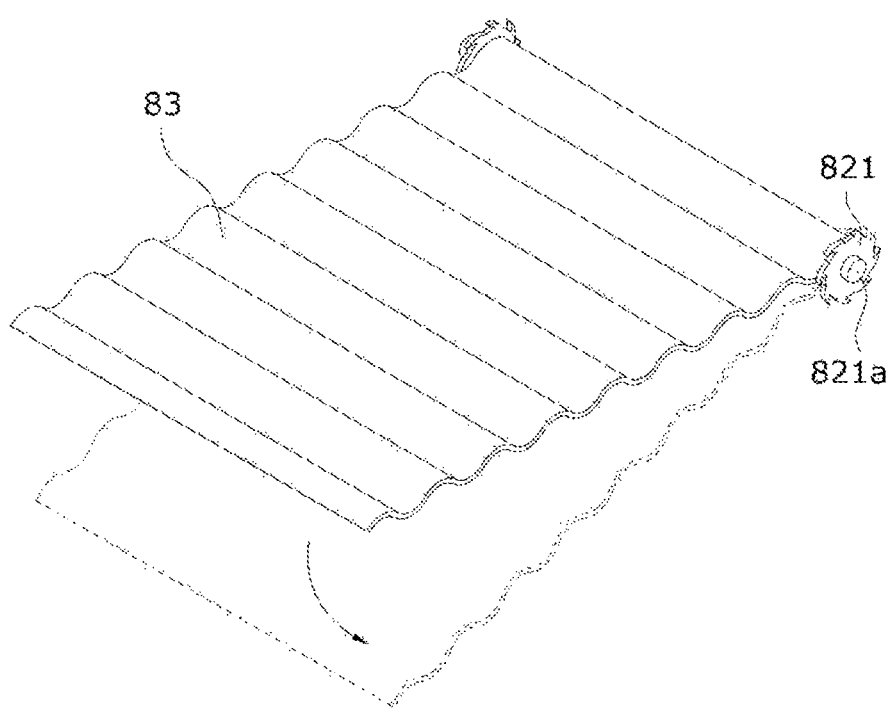
FIG. 9 is a perspective view of a fall guide plate according to an embodiment of the present invention.

The fall guide plate 83 is composed of a corrugated plate structure that is maintained in a horizontal state, as shown in FIG. 9. A rotating shaft 821a is coupled to one end of the corrugated plate structure, and second ratchet gears 821 configured to be engaged with the first ratchet gear 82 are formed at both ends of the rotating shaft 821a.

Furthermore, a rod arrangement portion 91 configured to prevent the grilling rods 100 falling sequentially via the fall guide plate 83 from being concentrated and stacked at any one position is formed on the bottom of the inner side of the collection container 60.

As described above, in the movable type grill roaster according to the embodiment of the present invention, as shown in the accompanying FIGS. 1 to 9, first, the rods 100 for charcoal grilling such as that shown in the accompanying FIG. 7(a) or the rods 100' for grilling meat without seasoning having one of them shown in the accompanying FIGS. 7(b), 7(c) and 7(d) are introduced into the supply part 10 composed of a hopper, and then the top opening of the supply part 10 is sealed with a cover.

Thereafter, when the first motor 21 of the drive unit 20 is driven, the driving gear 21a is rotated in response to the driving of the first motor 21, and the rotation of the first driven gear 22 connected via the driving belt 22a is enabled.

In this case, the first chain gear 23 is installed in the first driven gear 22 by a fastening shaft, the second chain gear 24 is installed at a location higher than the first chain gear 23 at an inclined angle, and the third chain gear 25 is installed on a horizontal line extended from the second chain gear 24 by a predetermined distance. The second chain connection pieces 32 of the chain part 30 are connected to the first, second and third chain gears 23, 24 and 25 to form a closed circuit.

As the first, second, and third chain gears 23, 24, and 25 are rotated in conjunction with the rotation of the first driven gear 22, the chain part 30 forming a pair of left and right portions is rotated. Accordingly, the grilling rods 100 drawn out from the rod exit 11 of the supply part 10 are seated in the bucket depressions 41 formed in the upper portions of the first chain connection pieces 31 one by one, and may be transferred.

Meanwhile, both side ends of the grilling rods 100 that are seated and transferred in the bucket depressions 41 come into contact with the rod rolling part 50 when passing through the horizontal section, and the grilling rods 100 are rolled at a uniform speed.

In this case, when the grilling rods 100 are rolled by the rod rolling part 50, the rotation speed thereof is maintained at ½ of the rotation speed of the chain part 30. The reason for this is to ensure sufficient heat transfer to the surface of meat in contact with the grilling rods 100.

Accordingly, the grilling rods 100 are successively supplied to the roasting region of the movable type grill roaster along the chain and fill the top surface, thereby forming a grill roasting plate composed of rods that are arranged at close intervals.

Thereafter, a user may place meat on the grill roasting plate to which new grilling rods 100 are successively supplied.

In other words, as the grilling rods 100 are not stopped along the chain and are successively supplied, the meat placed on the grilling rods 100 is moved to one side along with the grilling rods 100 that are rotated and moved. Accordingly, sufficiently cooked meats are collected on one side. Meanwhile, there is repeated a circulating process in which when meat is additionally placed on newly supplied grilling rods 100, the placed meat is roasted and moved. Accordingly, the user may enjoy a meal while having a conversation with a required amount of meat placed on the grilling rods 100 without worrying about the meat burning.

In this case, when meat is placed at the point where the supply of the grilling rods 100 starts, the meat placed on the grilling rods 100, which is supplied densely and successively with both ends thereof mounted on the bucket portions 40 along the chain part 30, is evenly cooked while passing over the charcoal fire slowly. Since the grilling rods 100 are successively rotated and moved, the meat may be evenly cooked without burning.

Meanwhile, the contaminated grilling rods 100, which have been moved to one side after finishing roasting the meat, approach the collection container 60, are separated from the bucket depressions 41 formed in the upper portions of the chain part 30 when they reach the third chain gear 25, and then fall freely into the collection container 60.

Even in this case, the supply of the grilling rods 100 from the supply part 10 continues. In other words, the grilling rods 100 are successively supplied and moved over a charcoal fire, and the grilling rods 100 are successively supplied even when meat is not placed over a charcoal fire after a meal. Accordingly, the a charcoal fire is covered with the moving grilling rods 100.

Accordingly, in order to take out a charcoal fire after the roasting of meat, to add charcoal to a charcoal fire, or to change the type of grilling rods 100 to change the type of meat for roasting, there is a need for the supply of the grilling rod 100 to be temporarily stopped.

Even in this case, the chain part 30 continues to move. However, there is moved the empty chain part 30 in which the grilling rods 100 are not loaded onto the chain part 30. Then, when the grilling rods 100 loaded onto the chain part 30 are collected into the collection container 60, the grilling rods 100 constituting a grill are not present in the horizontal section of the chain, and there is maintained a state in which a grill over a charcoal fire has been removed, i.e., a state in which a grill covering a portion over a charcoal fire has been removed.

As described above, the contaminated grilling rods 100 that have been moved to one side after finishing the roasting of meat freely fall into the collection container 60 while being separated from the bucket depressions 41. In this case, since the grilling rods 100 contaminated with oil have viscosity due to oil or seasoning attached onto the surfaces of the grilling rods 100 and fall into the collection container 60 in a disordered manner, a problem arises in that the grilling rods 100 are tangled with one another in different directions and thus a storage space cannot be used efficiently.

Accordingly, it is preferable to additionally install the fall guide plate 83 at a location above the collection container 62 in order to guide the grilling rods 100 to a minimum fall location in a horizontally arranged state.

The fall guide plate 83 is composed of a corrugated plate structure. This is intended to guide the grilling rods 100 to the minimum fall location in a horizontally arranged state, thereby preventing the inefficient use of a storage space attributable to disordered storage.

The fall guide plate 83 is installed such that the inclination angle thereof is changed in conjunction with the first ratchet gear 82 provided on one side of the collection container 60. Through this, the grilling rods 100 falling from the bucket depressions 41 are sequentially dropped so as to be evenly distributed in the collection container 60.

In other words, when the first ratchet gear 82 is rotated, the inclination angle of the fall guide plate 83 may be sequentially changed because the second ratchet gears 821 formed on both left and right ends of the rotating shaft 821*a* are engaged with the first ratchet gears 82, as shown the accompanying FIGS. 3 and 9. Through this change of the inclination angle, the grilling rods 100 falling from the bucket depressions 41 may be evenly contained in the collection container 60.

In this case, since the rod arrangement portion 91 is formed on the bottom surface of the inside of the collection container 60, the grilling rods 100 freely falling sequentially via the fall guide plate 83 are prevented from being concentrated at any one location in the collection container 60 by the rod arrangement portion 91, i.e., the grilling rods 100 are maintained in an evenly distributed stacked state.

Figure 10:
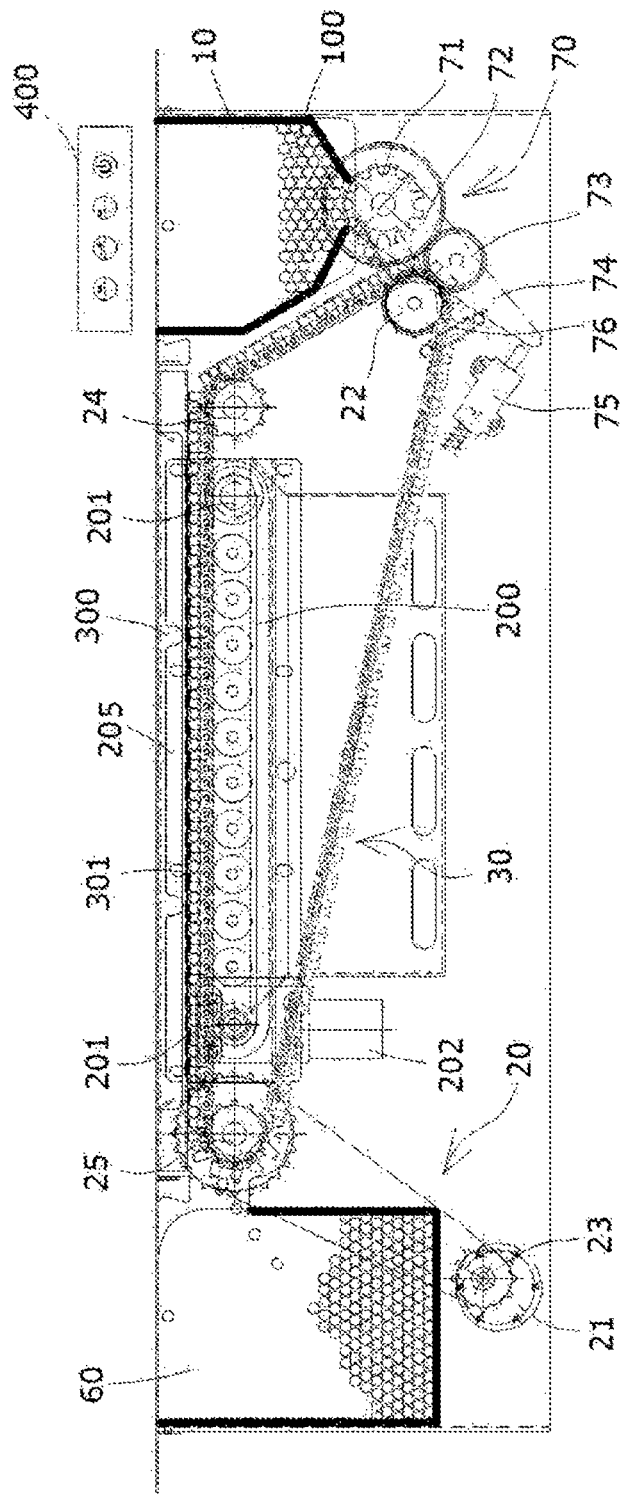
FIG. 10 is a sectional schematic diagram of an overall movable type grill roaster showing a state in which a drawing-out blocking member and a rod rolling ring are installed in the rod exit of a hopper, i.e., a supply part, according to an embodiment of the present invention.
Figure 11:
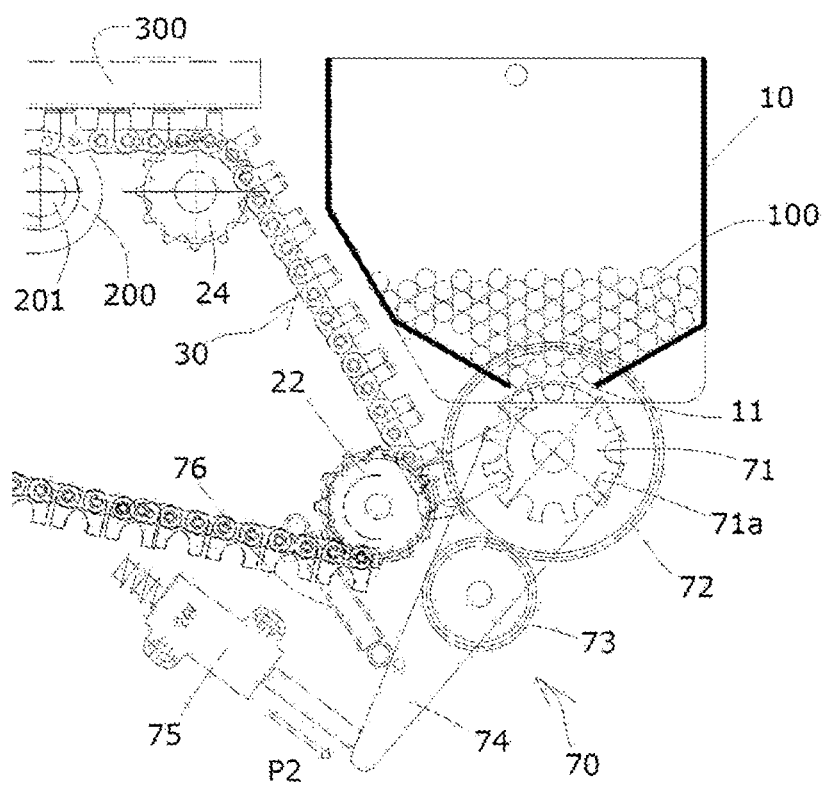
FIG. 11 is an enlarged view showing a state in which the drawing out of grilling rods from a rod exit is blocked by a drawing-out blocking member according to an embodiment of the present invention.
Figure 12:
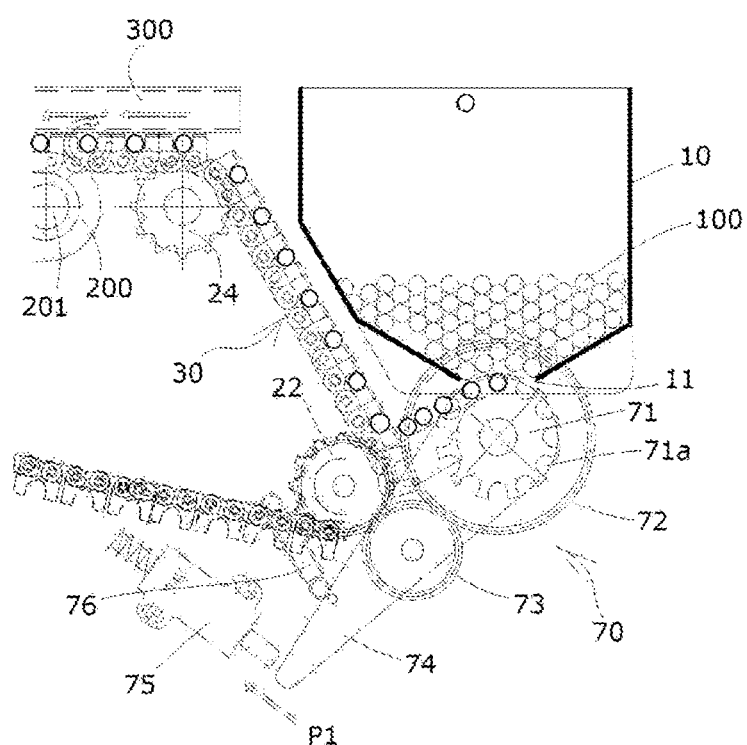
FIG. 12 an enlarged view showing a state in which the drawing out of grilling rods from the rod exit is allowed by the drawing-out blocking member according to the embodiment of the present invention.

In the present invention, more preferably, as shown in the accompanying FIGS. 10 to 12, an electric drawing-out blocking member 70 that operates in conjunction with the drive unit 20 may be formed in the rod exit 11 in order to temporarily block of the drawing out of the grilling rod 100 when roasting is stopped.

The drawing-out blocking member 70 includes: a rod supply wheel 71 disposed near the rod exit 11 of the supply part 10, and provided with drawing-out depressions 71*a* that are intended to sequentially draw out the grilling rods 100, drawn out from the rod exit 11, one by one; a second driven gear 72 configured to form an integrated structure with the rod supply wheel 71 and to rotate the rod supply wheel 71 in order to draw out the grilling rod 100; a transfer gear 73 configured to be engaged with the first driven gear 22 that transfers driving force and the second driven gear 72 and to rotate the second driven gear 72 in response to the driving force of the first motor 21 that is transferred from the driven gear 22; a clutch lever 74 connected to the transfer gear 73, and configured to operate to perform engagement or disengagement between the transfer gear 73 and the first driven gear 22; an actuator 75 configured to move the clutch lever 74 through the operation of coming into contact with the clutch lever 74; and a spring 76 configured to return the clutch lever 74 to its original position so that the transfer gear 73 is engaged with the first driven gear 22 when the actuator 75 does not come into contact with the clutch lever 74.

In other words, as shown in the accompanying FIG. 12, in the state in which the rod supply wheel 71 coupled to the second driven gear 72 blocks the rod exit 11 of the supply part 10, the grilling rod 100 drawn out from the rod exit 11 of the supply part 10 is drawn out and seated in the drawing-out depression 71*a* formed in the rod supply wheel 71.

In this case, when the actuator 75 is moved in the arrow direction P1 and separated from the clutch lever 74, the transfer gear 73 connected to the clutch lever 74 is engaged with the first driven gear 22 for driving force transfer by the restoring force of the spring 76. In this case, since the transfer gear 73 is engaged with the second driven gear 72, the transfer gear 73 and the second driven gear 72 may be rotated using the driving force of the first motor 21 that is transferred through the first driven gear 22.

Then, as the rod supply wheel 71 that forms an integrated structure with the second driven gear 72 is rotated, the grilling rod 100 seated in the drawing-out depression 71*a* formed in the rod supply wheel 71 is sequentially seated on the chain part 30.

In contrast, as shown in the accompanying FIG. 11, in the state in which the rod supply wheel 71 coupled to the second driven gear 72 blocks the rod exit 11 of the supply part 10, the grilling rod 100 drawn out from the rod exit 11 of the supply part 10 is drawn out and seated in the drawing-out depression 71*a* formed in the rod supply wheel 71.

In this case, when the actuator 75 is moved in the arrow direction P2 and pushes the clutch lever 74, the transfer gear 73 connected to the clutch lever 74 is separated from the first driven gear 22 for driving force transfer. In this case, the driving force of the first motor 21 is not transferred to the transfer gear 73 via the first driven gear 22. Accordingly, not only the transfer gear 73 but also the second driven gear 72 are not rotated.

Then, as the rod supply wheel 71 that forms an integrated structure with the second driven gear 72 is not rotated, the sequential drawing out of the grilling rod 100, seated in the drawing-out depression 71*a* formed in the rod supply wheel 71, to the chain part 30 is blocked.

Figure 13:
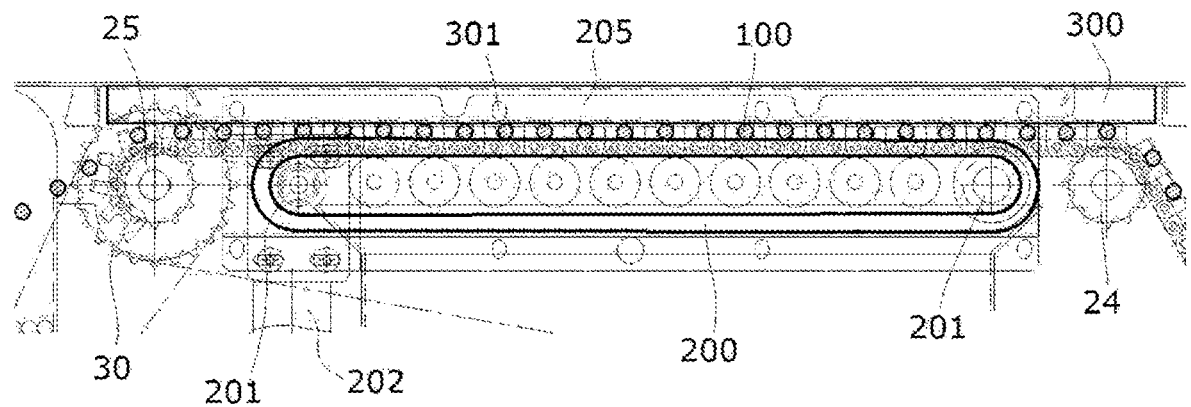
FIG. 13 is a sectional schematic diagram showing a state in which a rod rolling ring and a fastening bracket configured to prevent the upward separation of grilling rods are installed beneath and over a chain part, respectively, according to another embodiment of the present invention.

Meanwhile, as another embodiment of the present invention of the rod rolling part, as shown in the accompanying FIGS. 10 and 13, a rubber ring belt-type rod rolling ring 200 configured to come into contact with the bottoms of the grilling rods 100 in order to roll the grilling rods 100 may be disposed beneath the chain part 30, and a rod separation prevention fastening bracket 300 configured to be closely tightened by vertically elongated holes 301 in order to prevent the grilling rods 100 from being separated upward may be installed over the chain part 30.

In other words, guide rollers 201 are disposed at both ends of a portion beneath the chain part 30, the rod rolling ring 200 is connected around the guide rollers 201 to form a closed loop, and a second motor 202 is connected to any one of the plurality of guide rollers 201.

Then, the guide roller 201 is rotated in response to the driving of the second motor 202 and rotates the rod rolling ring 200, and accordingly, the rod rolling ring 200 comes into tight contact with the bottoms of the grilling rods 100 and rotates the grilling rods 100. Accordingly, as the bottoms of the grilling rods 100 seated in the bucket depressions 41 come into contact with the rod rolling ring 200, the grilling rods 100 seated in the bucket depressions 41 may be more easily rotated, and may also be rapidly moved along the chain part 30.

In this case, since the fastening bracket 300 is closely tightened to the chain part 30 by the vertical elongated holes 301, the surface of the rod rolling ring 200 may be maintained in sufficient contact with the bottoms of the grilling rods 100, thereby preventing the grilling rods 100 from being separated upward.

The fastening bracket 300 that is lifted in a vertical direction along the vertical elongated holes 301 so that the surface of the rod rolling ring 200 is maintained in sufficiently close contact with the bottoms of the grilling rods 100 is illustrated as the structure of a rod located over the grilling rods 100 in the drawings in the configuration of the present invention. However, it is obvious that this may be installed on one surface of a front-rear fastening plate 205 that supports the pair of guide rollers 201 installed at both ends to be spaced apart from each other and the rod rolling ring 200 connected to form a closed loop around the guide rollers 201.

In other words, in order to maintain the surface of the rod rolling ring 200 in sufficiently close contact with the bottoms of the grilling rods 100, the rod-shaped rod separation prevention fastening bracket 300 that is located over the grilling rods 100 may be moved downward. In another embodiment, the front-rear fastening plate 205 that maintains the pair of guide rollers 201 installed at both ends to be spaced apart from each other and the rod rolling ring 200 connected around the guide rollers 201 as a single unit block may be lifted upward.

When the surface of the rod rolling ring 200 is maintained in sufficiently close contact with the bottoms of the grilling rods 100 as described above, the grilling rods 100 in contact with the rod rolling ring 200 are continuously rolled while maintaining a constant speed. Accordingly, meat placed on the grilling rod 100 is not pressed against the surface of the grilling rod 100, and also the surfaces of the grilling rods 100 heated by a charcoal fire are always maintained at a constant temperature by rotation, thereby conserving heat needed for the roasting of meat. In particular, the falling of the oil, seeping from the meat and attached onto the surfaces of the grilling rods 100, onto a charcoal fire may be delayed or prevented.

Figure 14:
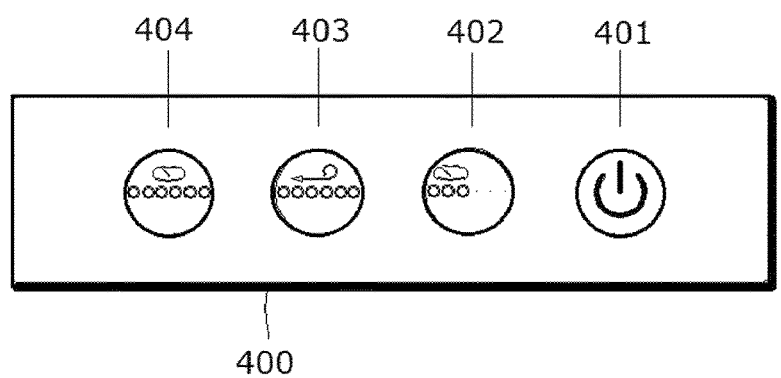
FIG. 14 is an enlarged view of a control panel for automatically controlling the moving state of a grill according to another embodiment of the present invention.

Meanwhile, the movable type grill roaster according to the embodiment of the present invention may be equipped with a touch-type control panel 400, as shown in the accompanying FIGS. 10 and 14. The control panel 400 is provided with a power on/off switch 401, a first button 402 configured to provide notification of a state of finishing a meal, a second button 403 configured to request the replacement of a roasting grill during a meal, and a third button 404 configured to allow a roasting grill to be slowly replaced.

In other words, in the state in which the power on/off switch 401 is switched on, when a user presses the first button 402, notification of a state in which the user finishes a meal is provided to a counter, and the roasting plate is opened through the rotation of the chain part 30 by stopping the supply of the grilling rods 100 so that a charcoal fire can be removed. When the second button 403 is pressed, the rotational speed of the chain part 30 is increased in a state in which the supply of the grilling rods 100 continues, so that the rapid replacement of the grilling rods 100 is possible. When the third button 404 is pressed, the grilling plate is slowly replaced during a meal.

While the technical spirit of the movable type grill roaster of the present invention has been described with reference to the accompanying drawings above, this is intended to illustrate the most preferred embodiment of the present invention, but does not limit the present invention.

Therefore, the present invention is not limited to the specific embodiments described above, and any person having ordinary knowledge in the art to which the present invention pertains may make various modifications without departing from the gist of the present invention claimed in the claims. It is obvious that such modifications fall within the scope of the claims.

The invention claimed is:

1. A movable type grill roaster comprising:
   a supply part adapted to sequentially supply grilling rods in order to form a grill roasting plate, and configured such that a bottom surface thereof is composed of an inclined hopper, a rod exit is formed at a lower end of the hopper, and a drawing-out blocking member configured to temporarily block supply of the grilling rods that are successively loaded into bucket depressions is disposed outside the rod exit;
   a chain part configured to include a pair of left and right parts, to have the bucket depressions in which the grilling rods sequentially supplied from the supply part are sequentially seated and arranged, and to be rotated and transferred by a drive unit and sequentially transfer the grilling rods;
   a rod rolling part configured to, when the grilling rods seated and arranged in the bucket depressions of the chain part are sequentially transferred, come into elastic contact with both side ends of the grilling rods and continuously roll the grilling rods in contact with meat at a predetermined speed; and
   a collection container configured to, when the grilling rods that have been used as a grill roasting plate fall from the chain part while being transferred by the chain part, collect the falling the grilling rods;
   wherein the drawing-out blocking member comprises:
   a rod supply wheel disposed near the rod exit, and provided with drawing-out depressions that are intended to sequentially draw out the grilling rods, drawn out from the rod exit, one by one;
   a second driven gear configured to form an integrated structure with the rod supply wheel and to rotate the rod supply wheel in order to draw out the grilling rod;
   a transfer gear configured to be engaged with a first driven gear transferring a driving force and the second driven gear and to rotate the second driven gear in response to a driving force of a first motor that is transferred from the first driven gear;
   a clutch lever connected to the transfer gear, and configured to operate to perform engagement or disengagement between the transfer gear and the first driven gear;
   an actuator configured to move the clutch lever through an operation of coming into contact with the clutch lever; and
   a spring configured to return the clutch lever to its original position so that the transfer gear is engaged with the first driven gear when the actuator does not come into contact with the clutch lever.

2. The movable type grill roaster of claim 1, wherein the rod rolling part comprises:
   guide rollers disposed at both ends of a portion beneath the chain part;
   a rubber ring belt-type rod rolling ring configured to be coupled to the guide rollers in order to roll the grilling rods beneath the chain part, to form a closed loop, and to come into tight contact with bottoms of the grilling rods; and a second motor connected to any one of the plurality of guide rollers.

3. The movable type grill roaster of claim 2, wherein a rod separation prevention fastening bracket configured to be closely tightened via vertical elongated holes in order to prevent the grilling rods from being separated upward is installed over the chain part.

4. The movable type grill roaster of claim 1, wherein the movable type grill roaster is equipped with a touch-type control panel, and the control panel is provided with a power on/off switch, a first button configured to provide notification of a state of finishing a meal and to request removal of a charcoal fire, a second button configured to control a moving speed to become higher so that an overall roasting plate in use is rapidly replaced, and a third button configured to allow a roasting plate on which food to be roasted is placed to be slowly moved horizontally and then collected in a general dining mode.

5. The movable type grill roaster of claim 2, wherein the movable type grill roaster is equipped with a touch-type control panel, and the control panel is provided with a power on/off switch, a first button configured to provide notification of a state of finishing a meal and to request removal of a charcoal fire, a second button configured to control a moving speed to become higher so that an overall roasting plate in use is rapidly replaced, and a third button configured to allow a roasting plate on which food to be roasted is placed to be slowly moved horizontally and then collected in a general dining mode.

\* \* \* \* \*